Dec. 20, 1966 P. H. SMITH ET AL 3,293,085
ELECTRICALLY RESISTIVE BARRIER FILMS
AND ELEMENTS EMBODYING THE SAME
Filed Sept. 20, 1962 5 Sheets-Sheet 1

INVENTORS
Paul H. Smith
John L. Miles
BY
Attorney

INVENTORS
Paul H. Smith
John L. Miles
BY
Attorney

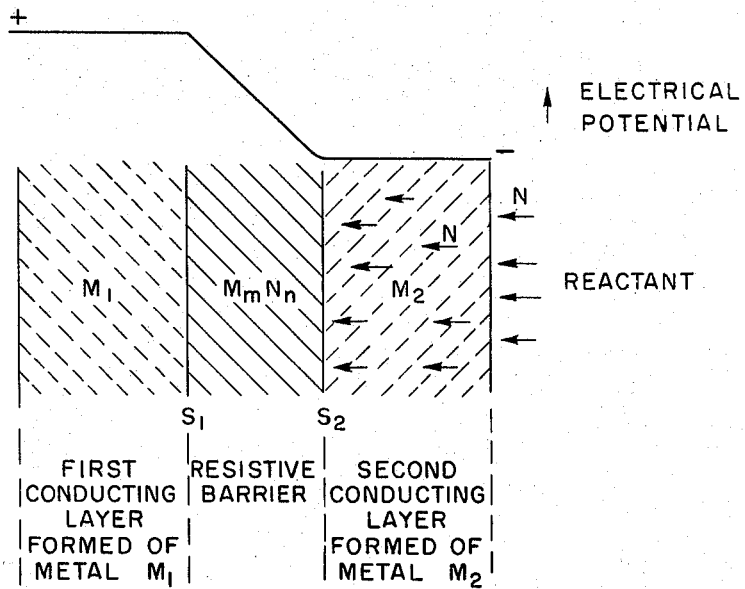
Fig. II
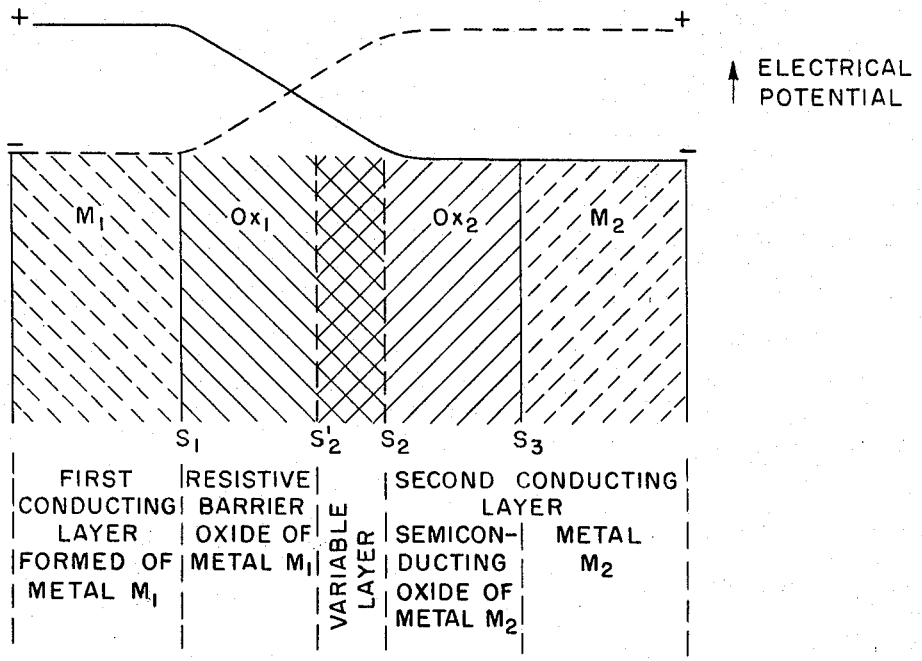
Fig. 12

INVENTORS
Paul H. Smith
John L. Miles
BY
Attorney

Dec. 20, 1966 P. H. SMITH ET AL 3,293,085
ELECTRICALLY RESISTIVE BARRIER FILMS
AND ELEMENTS EMBODYING THE SAME
Filed Sept. 20, 1962 5 Sheets-Sheet 5

INVENTORS
Paul H. Smith
John L. Miles
BY
Attorney

> United States Patent Office 3,293,085
Patented Dec. 20, 1966

3,293,085
ELECTRICALLY RESISTIVE BARRIER FILMS AND
ELEMENTS EMBODYING THE SAME
Paul H. Smith, Arlington, and John L. Miles, Belmont,
Mass., assignors to Arthur D. Little, Inc., Cambridge,
Mass., a corporation of Massachusetts
Filed Sept. 20, 1962, Ser. No. 225,101
13 Claims. (Cl. 148—6.3)

This invention relates to a method for forming a resistive barrier film, to the resulting film produced thereby, and to electronic circuit elements embodying the film. In particular, this invention relates to forming films capable of controlling the passage of electrical currents and to electronic elements incorporating these films.

It has long been known that certain metals can be chemically treated to form a thin layer of dielectric on their surface, the dielectric being a compound which is the reaction product of the metal and chemical treating agent. Generally these compounds deposited on the metal surface form a barrier against further reaction and thus additional thickening of the barrier is in some cases difficult, in others impossible. Probably the best example of such a barrier is the formation of aluminum oxide on aluminum. Aluminum surfaces will readily oxidize in normal atmospheres to form a layer of aluminum oxide on the surface, the thickness of which is limited to about 20 A. If heated in an oxidizing atmosphere to about 500° C., an aluminum surface will oxidize readily to form a layer of aluminum oxide up to about 40 A. Since aluminum oxide is known to be highly resistive to further oxidation as well as to many other corrosive reactions, it is purposely formed on many aluminum articles.

In order to form, in a controllable manner, a layer of aluminum oxide having a consistent thickness throughout, it is customary to anodize the aluminum surface. The now well-known process of anodizing comprises immersing the aluminum article in a liquid electrolyte and applying a potential across it such that negatively charged oxygen ions derived from the electrolyte are directed to the surface of the aluminum article serving as the anode in the circuit. In recent years, this type of oxidation which may be termed "wet" anodization to contrast it with the method described herein, has been applied successfully to many other metals including, but not limited to tantalum, titanium, zirconium, niobium, uranium, beryllium, manganese, magnesium and the like. However, as will be shown below, there are certain inherent disadvantages in forming oxide films on many of these metals by the wet anodization process. In particular, it introduces problems in the construction of small electronic circuit elements such as capacitors and resistors.

In recent years with the development of new active electronic elements, (e.g., cryotrons, tunneling devices, field emission amplifiers, thin magnetic film elements, and the like), it has come to be recognized that there must be developed methods for forming film barriers capable of controlling the passage of electricity, i.e., behaving as true insulators or as dielectric layers which are capable of permitting the passage of substantial tunneling currents. Moreover, the rather recent developments in microminiaturization have pointed out the need for extremely small inactive or passive electronic devices among which may be listed capacitors and resistors. The size of such devices, the requirement for extremely exacting dimensions, the need to be able to make them in quantity and the absolute necessity of good quality control has, of course, indicated the need for the development of techniques other than soldering, laminating and the like which are limited to the extent to which they can be applied to very small devices. This, in turn, has meant that techniques such as anodizing and vapor deposition in patterns have been used to overcome the drawbacks inherent in the heretofore standard techniques for making circuit elements.

As an example, aluminum oxide appears very attractive as an electron barrier material (either as insulation or as a dielectric layer for tunneling). However, in order to put a coating of aluminum oxide on an aluminum surface, it is necessary to either oxidize it in air or in some other oxidizing atmosphere or to anodize it. The former technique, if carried out at room temperature, limits the ultimate thickness of the aluminum oxide film; and if carried out at elevated temperature, requires intense heating of the device being formed.

Although wet anodizing offers the possibility of forming thicker films of aluminum oxide, of controlling the thickness of the oxide, and of making a film of uniform thickness, there is associated with this process a number of inherent disadvantages particularly if the resulting film is to be incorporated into an electron element. Among these disadvantages may be listed the necessity for immersing the article in an electrolyte which is a liquid, the possibility that the film formed is soluble or partially soluble in the liquid electrolyte, the possibility that the film will have included within it constituents derived from the electrolyte, which leave weak spots and lead to high leakage currents, and finally the limitation on the type of negatively charged ions which can be furnished by the electrolyte and hence upon the chemical characteristic of the barrier film itself. Thus both the metal and the barrier film surface are limited in quality and kind.

It will therefore be desirable to have available a method for forming a barrier film capable of controlling the passage of electron current, the thickness of the film being one which could be accurately and continuously controlled and formed to a desired magnitude. It would also be desirable to have such a method which could be performed over a wide temperature range without exposing the metal surface to a liquid, and which can be extended to a number of metals and barrier films. Finally, it would be desirable to have such a method which could be performed at least partially in atmospheric conditions, i.e., outside an evacuated chamber.

It is therefore the primary object of this invention to provide an improved method for depositing a barrier film on a surface of an electrically conducting body through chemical reaction with the surface. It is another object of this invention to provide a method of the character described which can be carried out over a wide temperature range, and without the use of liquid electrolytes. It is an additional object to provide such a method which is extendable to metals and other electrically conducting materials heretofore not usable and to the deposition of barrier films heretofore not formable on metal surfaces. It is another primary object of this invention to provide a method for making active and passive circuit elements of the character described which are particularly suited for microminiaturized circuits and which offer greater flexibility in construction and use than heretofore possible.

It is yet another object of this invention to provide films which do not contain undesirable constituents, and which are capable of exhibiting improved performance in electron circuit elements such as resistors and capacitors. It is another object to provide such films which are capable of good quality control as well as thickness control. It is yet another object to provide such films which are incorporated in active and passive circuit elements and form a part thereof. Other objects of the invention will in part be obvious and will in part be apparent hereinafter.

The invention accordingly comprises the several steps and the relation of one or more of such steps with respect to each of the others, and the article possessing features, properties, and relation of elements, which are exemplified in the following detailed disclosure, and the scope of the invention will be indicated in the claim.

For a fuller understanding of the nature and objects of the invention, reference should be had to the following detailed description taken in connection with the accompanying drawings in which:

FIG. 11 is a diagrammatic representation showing the formation of the barrier film as illustrated in FIGS. 5-7;

FIG. 12 is a similar diagrammatic representation showing the formation of the barrier film illustrated in FIGS. 8 and 9;

Figure 1:
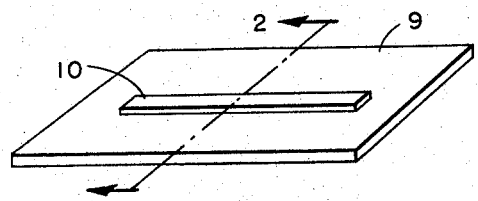
FIGS. 1-6 illustrate top plan and cross-sectional views of the steps involved in the construction of the barrier film of this invention.
Figure 2:
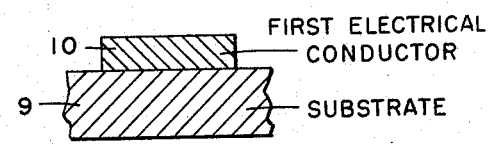
Figure 3:
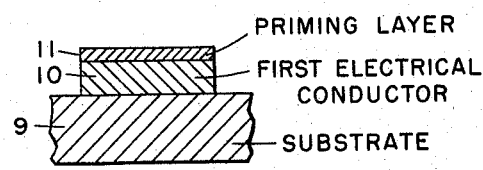

In brief, the method of this invention may be described as comprising the steps of depositing on the surface of a first electrically conducting layer or body a priming layer of a compound formed by reacting the surface of the first electrically conducting layer with a reactant, depositing on the surface of the priming layer a second electrically conducting layer, applying an electrical potential across the priming layer, and simultaneously with the step of applying the electrical potential providing an additional quantity of the reactant from the second electrically conducting layer at the growth interface between the priming layer and the second conducting layer. The application of the electrical potential causes ions from the first electrically conducting layer to dissolve in and diffuse through the barrier film to the growth interface.

As will be shown below, the second electrically conducting layer may take various forms, i.e., it may be a metal having the reactant occulated or dissolved therein, a porous metal through which the reactant may diffuse from the atmosphere, or a dual layer comprised of a metal and an oxide of the metal which is a semiconductor, the semiconductor being in contact with the barrier film and being capable of existing in a nonstoichiometric state.

In a co-pending application filed in the name of John L. Miles, and assigned to the same assignee as this application, Serial No. 225,100, now abandoned and refiled as a continuation-in-part as Serial No. 282,187, for Method of Forming Resistive Barrier Films and Resulting Product, there is described a novel process for forming a barrier film on an electrically conducting surface using gaseous plasma to provide negatively charged ions for reaction. In contrast to the method described in the above-identified application, the method of this invention uses solid state techniques, supplying the reactant from solid solution or from conditions which are in effect equivalent to a solid solution.

As will become apparent in the description of the process, it is necessary in forming the barrier film of this invention to provide positive and negative ions at the proper growth interface to bring about controlled growth of the barrier film. This is done by applying an electrical potential across the priming film which is resistive to the passage of an electron current. This application of potential brings about the solution of positively charged ions from the first electrically conducting layer in the barrier film and their subsequent diffusion to the growth interface. Simultaneously negative charged reactant ions are provided by or through the second electrical conducting layer to be available for reaction with the positively charged ions.

It will be convenient in the following description of this invention to illustrate the formation of an aluminum oxide film on an aluminum surface. However, the invention is not limited to aluminum and an aluminum oxide barrier film, as will be evident in the detailed description which follows. In the following description, the steps of the process will be discussed first and then a theory for the mechanism by which the barrier film is formed will be presented.

Turning now to FIGS. 1-6 it will be seen that these illustrate in top plan and cross-sectional views the steps of the invention. It should be appreciated that no attempt has been made to draw any of the elements to scale since this would not be practical. Typical dimensions and film thicknesses will be illustrated in the examples given.

In making microminiaturized circuits it is convenient to deposit electron circuit elements in the form of films on a substrate, such deposition being usually achieved in vacuum. For example, a microscope slide serving as a substrate may be used, and have deposited upon it an aluminum strip in the form of a thin film, the deposition taking place within an evacuated bell jar and being achieved by heating pure aluminum and permitting the resulting vapor to be deposited upon the microscope slide through an appropriate pattern cut in a stencil. Such a strip of aluminum is illustrated in FIG. 1. A thin pure aluminum film strip 10 is deposited by vacuum deposition techniques onto a microscope slide 9 serving as a substrate. The resulting assembly with the aluminum film strip on the slide is shown in cross-section in FIG. 2.

Figure 10:
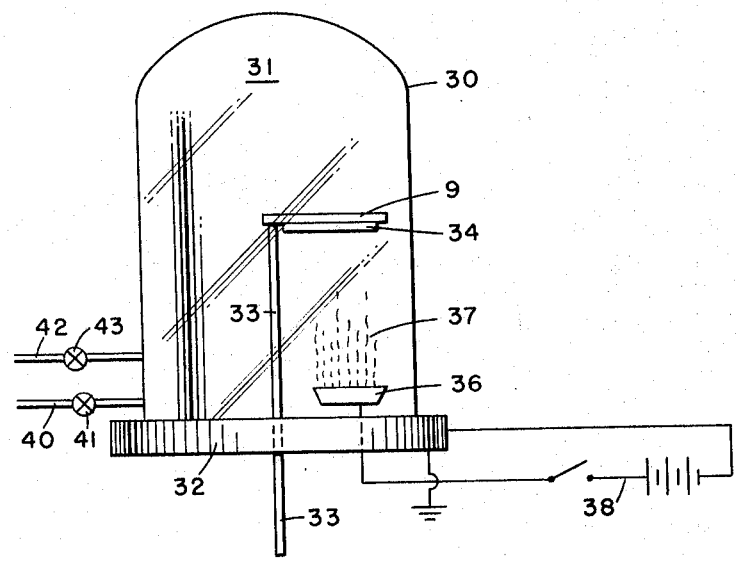
FIG. 10 illustrates a typical apparatus used in those steps of the method which require a controlled atmosphere.

A typical apparatus for depositing such a film as strip 10 on a substrate 19 is shown in somewhat simplified form in FIG. 10. In this apparatus there is provided a bell jar 30 which defines within it an evacuated atmosphere 31. The bell jar in turn is supported on a base 32 and sealed to it by a vacuum-tight seal. The microscope slide or other substrate 9 on which the film is to be deposited is held in place within the bell jar by a suitable support 33 which perferably extends down through the base 32 to permit maneuvering of the substrate within the bell jar. Fixed to the surface of the substrate 9 which is to receive the aluminum film is a stencil 34 which has cut in it the desired pattern. In the example used this pattern is in the form of a thin strip. There is also provided within the bell jar a source of the metal to be vaporized such as a boat 36 which, in this example, contains pure aluminum. Heating is accomplished through an electrical circuit and resistive heating indicated generally at 38. With sufficient heating of the aluminum, aluminum vapor 37 passes upwardly and strikes stencil 34 defining on substrate 9, the desired pattern in the form of a thin aluminum film. In this apparatus there is also provided an evacuation line 40 with a valve 41, and an inlet conduit 42 with valve 43, the latter providing means for introducing various gases into the bell jar atmosphere 31.

Subsequent to the deposition of the thin aluminum strip 10, valve 41 is closed and valve 42 is opened to permit introduction into the bell jar of a small amount of oxygen, in this case the reactant. In the presence of even the slightest amount of oxygen or water vapor within the bell jar 30, there is formed upon the aluminum strip 10 a very thin coat of aluminum oxide 11 (FIG. 3) which in this case is the required priming coat which is to be built up in thickness to become the electrical resistive barrier.

Although it is preferable, particularly in constructing miniaturized elements and circuits, to build up film layers as described above, the first electrically conducting layer need not be a film deposited on a substrate but may be a conducting body, i.e., a foil or sheet of the material. In many cases it is, of course, difficult to form a foil or sheet of the pure or near pure first conducting material and deposit on it a priming barrier film of controlled thickness. The technique described above using well developed vacuum techniques, on the other hand, offers accurate control in the formation of the layers and is therefore to be preferred.

The next step in the process is the deposition of a second conducting layer over the priming coat of the resistive barrier material, i.e., over the aluminum oxide in the example described here. This second electrically conducting layer must be so formed that it is capable of furnishing at the interface between it and the priming coat the required negatively charged ions, e.g., oxygen. Because the growth of the barrier film takes place at this interface it is hereinafter termed the "growth interface."

Figure 4:
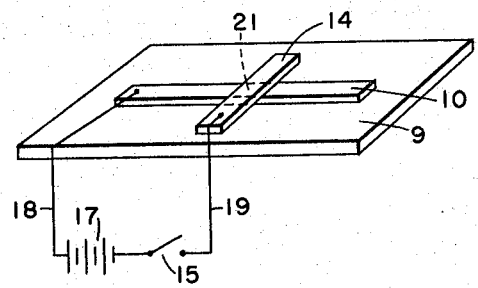
Figure 5:
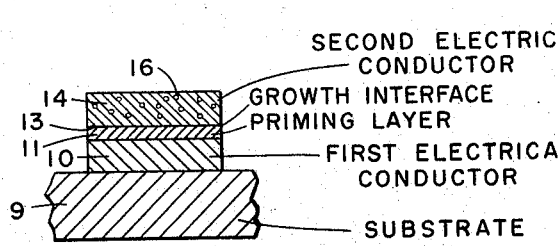
Figure 6:
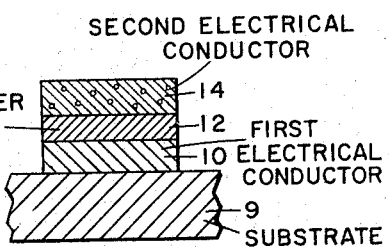

The second conducting layer may be formed to contain the reactant occluded or dissolved within it, i.e., formed with the reactant in solid solution. As an example, the second conducting layer may be tin with oxygen dissolved in it. FIGS. 4–6 illustrate the formation and use of such a second conducting layer.

FIG. 4 illustrates the formation of a cross-over area 21 of a second metal on the first metal strip. In the example used this is done by depositing a thin layer of tin 14 crossing the film of aluminum 10. As in the case of the deposition of the aluminum film 10, this deposition of the tin film 14 is accomplished in the apparatus of FIG. 10, substituting a source of pure tin for the aluminum and a suitable stencil in place of stencil 34. By evaporating the pure tin and permitting the vapors to pass through the pattern of the stencil the tin strip 14 is formed. In the process of depositing the tin, gaseous oxygen is occluded within the tin film layer. This is conveniently done by providing a gaseous atmosphere within the bell jar 20 and by regulating the rate of tin deposition in such a way that the required amount of oxygen is occluded. The amount of oxygen put into solution in the tin is controlled by the amount of oxygen present in the bell jar as well as by the rate at which the tin is deposited. Hence, it is possible to regulate the amount of occluded dissolved oxygen by regulating either the rate at which the tin is evaporated or the concentration of the oxygen in the bell jar, or both.

Although it is customary to deposit a film of aluminum, tin, lead and the like from the pure metal vapors, it is also within the scope of this invention to deposit a film of an organic compound of the metal and subsequently decompose the film to the pure metal such as by an electron beam. Thus, for example, tetraethyl lead may be used to form a lead film.

It will be seen from FIG. 5 that the resulting assembly formed in this step comprises multiple layers of films on substrate 9: a pure aluminum layer 10 serving as the first conducting layer on which is affixed a thin aluminum oxide priming layer 11 and on this a film of tin 14 containing oxygen 16 occluded therein.

The next step in the process is to build up the thickness of the priming aluminum oxide layer 11 at the growth interface 13 to form the barrier film 12 by causing the positively charged aluminum ions to go into solution in the aluminum oxide layer and to diffuse to the growth interface for reaction with the oxygen ions which diffuse through the tin layer. To do this the assembly, as shown in FIG. 4, may be removed from the bell jar inasmuch as the step of building up the barrier film thickness is one of applying an electrical potential across the priming film 11 (FIG. 5) and can be carried out at atmospheric pressure and over a wide temperature range. The required electrical potential is impressed across the priming barrier film by supplying voltage from a suitable source 17 through leads 18 and 19 and switch 15 to the aluminum strip 10 and tin strip 14.

The application of an electrical potential across the priming barrier film causes the buildup of an aluminum oxide film between the aluminum and tin film layers. This means that the occluded oxygen 16 diffuses as negatively charged oxygen ions to the aluminum oxide-tin interface 13 and that positively charged aluminum ions are transported through the aluminum oxide barrier film to this growth interface. There the reaction between the aluminum and oxygen ions takes place and the aluminum oxide barrier film 12 is built up as shown in FIG. 6.

As an alternative to forming a second electrically conducting layer with the reactant occluded therethrough, this second layer may be formed as a thin porous film which will permit the diffusion of the reactant, initially in the gaseous state, through it to the growth interface. Thus, if in the example above the tin film is deposited as an extremely thin layer 22 in porous form (FIG. 7), oxygen may diffuse through it and become ionized. It will be appreciated that if the oxygen is occluded in the film during its formation or if it diffuses from the surrounding atmosphere, it goes into solid solution in the tin film prior to its reaction with the positively charged aluminum ions. A second conducting layer which is a combination of the two types described, i.e., which has occluded gas and which is also sufficiently porous to allow gas diffusion through it from the atmosphere, may also be used.

Figure 7:
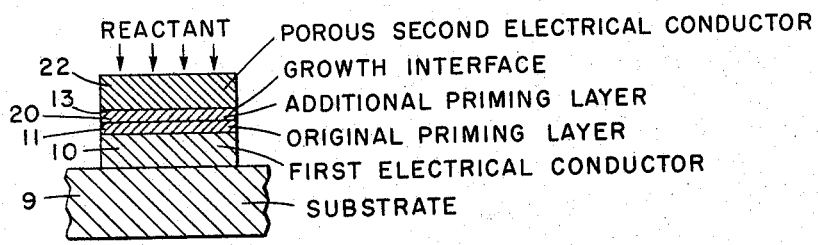
FIGS. 7-9 are cross-sectional views illustrating modifications in the method of the formation of the barrier film.

FIG. 7 also illustrates another modification in which the priming barrier layer 11 is increased in thickness as by adding additional oxide 20 prior to the deposition of the second conducting layer. The priming layer may be increased in thickness by the process of gaseous anodization as described in the above-identified copending application of John L. Miles. In brief this is done by exposing the assembly such as that represented by FIG. 3 to a gaseous plasma of oxygen ions under conditions of reduced pressure (to continue the example of aluminum and aluminum oxide) and then applying an electrical potential across the oxide barrier film.

Figure 8:
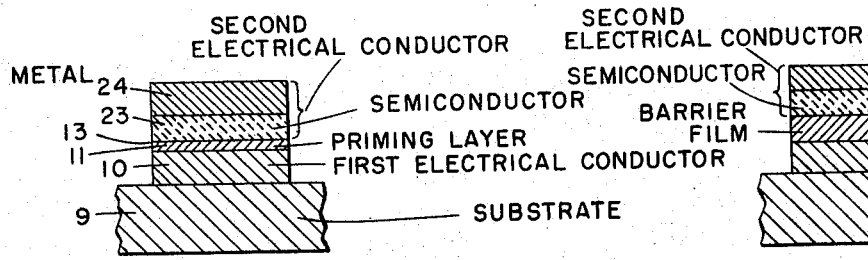
Figure 9:
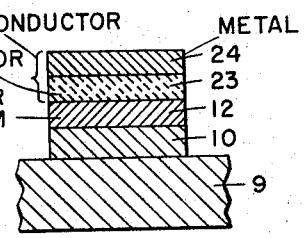

As noted above, there is a third type of electrically conducting layer which may be used to furnish the reactant at the interface. This is a dual-film layer comprising a metal and a semiconductor which is a compound of the metal and which is capable of existing in a nonstoichiometric state. Continuing to use the aluminum-aluminum oxide example, the dual layer will be a metal and an oxide of the metal, the oxide being a semiconductor. This dual-film type of layer is illustrated in FIGS. 8 and 9. In the arrangement illustrated in these drawings the first electrically conducting layer 10 and priming layer 11 are deposited in the usual manner. On the surface of priming layer 11 is then placed a film of a semiconducting metal oxide 23 and on this a film 24 of the metal itself. In the theoretical discussion presented below with reference to FIGS. 11 and 12, the mechanics by which the semiconducting oxide 23 furnishes the necessary reactant ions is explained. The properties required in the metals forming layers 10 and 24 and the semiconducting film will become self-evident.

After the various layers have been assembled as in FIG. 8 an electrical potential is applied across priming barrier film 11 to cause it to grow at the growth interface 13. As in the assemblies described above the positively charged aluminum ions are dissolved in and diffused through barrier 12 in the presence of the potential gradient and made available for reaction at the growth interface with negatively charged oxygen ions furnished from the semiconducting oxide film 23.

Several theories have been offered to explain the ability of selected conducting bodies to build up resistive films on their surfaces. Although we do not wish to be bound by any one theory, that set forth in the Transactions of the Faraday Society, volume XLIII, pages 429–434 (1947) appears to offer a reasonable explanation of the process by which a resistive barrier is formed by conventional wet anodization. It appears reasonable to apply essentially the same theory with some modifications to the method of this invention.

Turning now to FIG. 11, it will be seen that there is provided a conducting body or layer of a material $M_1$ (assumed in this example to be a metal) having a surface $S_1$ on which the protective barrier is to be built. It will be appreciated that this conducting body in the example given is the thin aluminum strip 10 of FIGS. 1–7 which is typically about 1000 A. thick. The barrier film itself has a surface $S_2$ which is the growth interface. The barrier film begins, of course, as the thin priming layer. Finally, there is the second conducting layer illustrated as a metal film containing the occluded reactant (indicated as arrows) which diffuses to surface $S_2$ to react with the metal ions at that surface. This reactant, in the above example, is the oxygen 16 occluded in the thin tin layer 14 of FIG. 4 or supplied from the atmosphere through the porous metal film 22 of FIG. 7.

It can be seen that as the resistive barrier, which is the reaction product of the negative oxygen ions furnished from or through the tin layer and the positive aluminum ions furnished from the pure aluminum surface, grows thicker there is presented the problem of bringing the required positively charged aluminum ions to the surface $S_2$ where growth is thought to take place. This is done by impressing an electrical field or potential across the resistive barrier. The presence of this electrical field is responsible for the growth of the barrier. This can be explained by postulating that the positive ions of the first conducting body, in this case aluminum, go into solid solution in the resistive barrier across which the electrical potential exists. This means that the positive ions can readily diffuse through the resistive barrier and, under the influence of the field or concentration gradient, are capable of drifting across the barrier to combine with the negative ions on the surface.

When the field across the resistive barrier of aluminum oxide becomes insufficient to effect any further solubility of the positively charged aluminum ions in the barrier due to increase in barrier thickness, it is necessary to increase the field strength to force more of the positive ions to diffuse through the barrier. This, of course, may be done by increasing the voltage across lead wires 18 and 19 as shown in FIG. 4. Thus, when the barrier has reached a thickness where the potential across it no longer causes solubility and diffusion of the positive ions through it, no more positive ions are available at surface $S_2$ for reaction with the negative ions diffusing through the second metal film. However, application of additional potential will cause more aluminum ions to diffuse through the barrier, and will enable the barrier formation to begin again. The process, of course, may be carried out until the desired barrier film thickness is attained.

It will be seen from the above description of the mechanism of the process of this invention, as well as from the theory presented, that the conducting layers as well as the resistive barrier must have certain characteristics. These may be further defined. The first layer which is put down and on which the resistive barrier is to be formed by reacting with its surface must be a conductor of electrical energy. It will normally be a metal, but it can be a semiconductor. The reactant which is provided from or through the second conducting layer and subsequently ionized must be a material which will react with the first electrical conductor surface to form a compound which in thin film form is capable of controlling the passage of an electrical current. That is, the barrier film formed must be capable of serving as a true insulator or of controlling the passage of a substantial tunneling current. Finally, the layer which is used to furnish the reactant to the reacting surface must be one which has a lower affinity for the negative ions which are to be supplied for the reaction than the first conductor material on which the resistive barrier is to be formed. It should also be a material on which the gaseous reactant has a relatively high solubility.

Among the metals which may be used as the first electrically conducting layer may be listed aluminum, titanium, magnesium, chromium, beryllium, and the like; while the second electrically conducting layer from which or through which the reactant is furnished may be chosen from metals including tin, lead and the like. The reactant is preferably oxygen, although some sulfides or nitrides may be used if they can form an electrically resistive barrier film.

FIG. 12 is a schematic representation of the mechanism involved when the second conducting layer comprises the combination of a semiconducting oxide and the corresponding metal. The theory which may be offered to explain the ability of this method to build up a resistive barrier film is basically the same as that offered in conjunction with FIG. 11, i.e., it is necessary to apply a potential across the priming layer and across the resistive barrier film as it grows in order to cause the positively charged ions of the first metal to go into solution and to diffuse to the growth interface $S_2$. In this case, however, the reactant oxygen in the example used, is supplied from the semiconducting oxide.

The mechanism of FIG. 12 offers the possibility of varying the actual width of the resistive barrier film by changing the direction of the electron current flow. In order to do this the two metals and the two metal oxides involved must possess certain properties relative to each other. These may be stated in the following manner. As in the more general case of FIG. 11 the oxide ($OX_1$) must be the resistive barrier, i.e., must be capable of controlling the flow of an electron current. Likewise the first conducting layer must be capable of conducting an electron current. $M_2$ forming a portion of the second conducting layer must likewise be an electrical conductor and must form a semiconducting oxide ($OX_2$) which is capable of existing in a non-stoichiometric state in order to make the oxygen available. In order to make the process of barrier film growth reversible it is necessary that the heats of formation of the two oxides should be very close, with that of the oxide forming the resistive barrier film being slightly greater than that of the semiconducting oxide. Finally the ions of the second metal should not be soluble to any appreciate extent in the oxide froming the resistive barrier film.

Assume first that an electrical potential is applied as indicated by the solid line, that is, $M_1$ is made positive and $M_2$ negative. This is the situation equivalent to that in FIG. 11 which caused the growth of the resistive barrier oxide film to take place at surface $S_2$. As in the case of FIG. 11, growth does occur at this surface, the positively charged $M_1$ ions dissolving and diffusing through $OX_1$ and the negatively charged ions diffusing from $OX_2$ to surface $S_2$. The resistive barrier film is therefore defined between surfaces $S_1$ and $S_2$.

Now assume that the direction of electron current flow is reversed as indicated by the dotted line representing electrical potential. $M_1$ is now made negative and $M_2$ positive. Reversal of the field causes the $M_1$ ions at the $S_2$ surface (growth interface) to experience a force tending to drive them back toward the surface $S_1$ of $M_1$ freeing oxygen ions in the process. Since there are free ions of $M_2$ available now in the semiconducting oxide there is a tendency for the $OX_2$ film to grow at the expense of $OX_1$ film particularly since their heats of formation are similar. Thus the resistive barrier film decreases in thickness and is defined by the surface $S_1$ and $S_2'$. There is therefore the possibility of establishing between the two oxide layers a layer defined between $S_2'$ and $S_2$ of variable thickness depending upon the direction of current flow.

A number of combination of metals can be used which satisfy the conditions specified for the metals and metal oxides. Among such combinations may be listed Al/Ti, V/Cr, Be/Ba, Mg/Ba, and Ta/Cr. Although metals and metal oxides will normally be used, other compounds such as sulfides which meet the requirements specified can be used in place of oxides.

It has been found that there is a direct relationship between the rate of barrier film growth and the temperature of the films at the time the potential is applied. Moreover there is a direct relationship between the amount of voltage impressed across the resistive barrier film and the barrier film growth as measured by the rate of change of resistance. Both of these facts may be used to good advantage in the controlling of the thickness of the barrier film.

Figure 13:
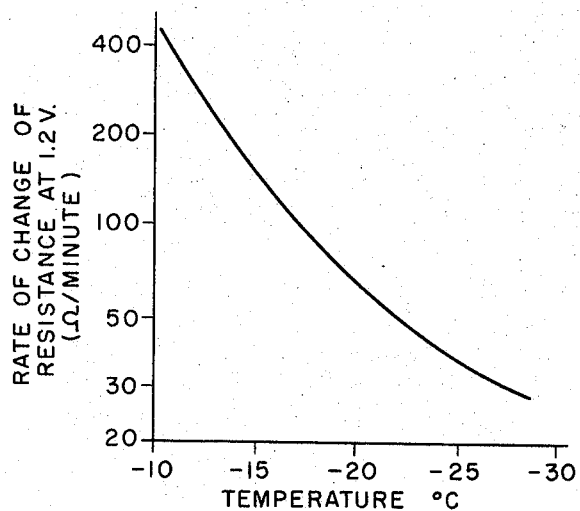
FIG. 13 is a plot of the rate of change of resistance with change in temperature at which voltage is applied.

Using the example of aluminum oxide on aluminum it has been found that it is not feasible to apply voltage to build up the aluminum oxide barrier film at temperatures below about −35° C. At temperatures below this no barrier film growth is noted. FIG. 13 is a plot of the rate of change of resistance (hence rate of change of barrier film growth) experienced by an assembly such as illustrated in FIGS. 5 and 6 with decreasing temperatures. A constant voltage of 1.2 volts was applied in the manner shown in FIG. 4 and the rate of change of resistance in ohms per minute was measured. It will be seen that this figure dropped from 420 at −10.5° C. to about 30 at −28° C. Thus by cooling the assembly to a temperature where the rate of resistance change is very low, it is possible to control the thickness of the barrier film with very great accuracy and at the same time to obtain an assembly with a predetermined resistance. Inasmuch as resistance is continuously measured while the barrier film is being formed it is possible to know at all times the resistance of the assembly and to cut off the voltage precisely where it desired to give the predetermined resistance in the device.

Figure 14:
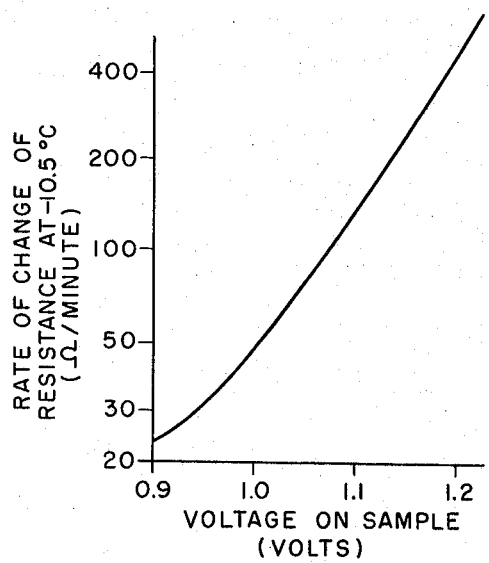
FIG. 14 is a plot of the rate of change of resistance with voltage applied with the samples maintained at $-10.5°$ C.

Control of resistance and hence of barrier film thickness is also possible through control of voltage on the sample. This is illustrated in FIG. 14 where voltage is plotted against rate of change of resistance. In obtaining the data for plotting FIG. 14 the sample was maintained at −10.5° C. From FIGS. 13 and 14 it will be seen that barrier film thickness and hence performance of the device may be accurately controlled by a combination of temperature control and applied voltage.

Devices made in accordance with this invention and in which a semi-conducting oxide is not part of the second conducting layer are essentially temperature insensitive once they are formed. However, there is some tendency for some further film growth to take place over a period of time if they are permitted to remain at atmospheric conditions. This appears to indicate that the contact potential at surface $S_2$ (FIGS. 11 and 12) is strong enough to cause a reaction between the positively charged ions that may drift through the barrier and the negatively charged ions that may diffuse to surface $S_2$. This tendency to experience further barrier film growth may be overcome by encapsulating the assembly or device such as by vapor-depositing a film of a few microns (e.g., two) thickness of arsenic trisulfide or some other suitable protective film around the assembly.

The method of this invention may be further described with reference to the following examples which are meant to be illustrative and not limiting.

In a bell jar such as illustrated in FIG. 10 a glass microscope slide, serving as a substrate, was held in position over a source of pure aluminum. A stencil, having a relatively long strip 0.1 mm. wide cut in it as a pattern, was affixed to the substrate slide. The bell jar was evacuated to about $10^{-5}$ mm. mercury and an aluminum strip 1000 A. thick was deposited from aluminum vapor through the stencil pattern on the slide. This step was carried out using well-known vacuum deposition technology.

The aluminum oxide priming layer was then formed by introducing dry oxygen into the bell jar at a pressure of about 50 microns. Oxidation was carried on for about 5 seconds at which time the oxygen was pumped out. Equally satisfactory oxide layers were formed by continuously sweeping dry oxygen at this pressure through the bell jar for about 5 seconds.

With the pressure in the bell jar again reduced to about $10^{-5}$ mm. mercury, a film of tin was slowly evaporated on the aluminum oxide. This was done by using a relatively long strip 0.1 mm. wide stencil placed at right angles to the aluminum strip to give a cross-over area of 0.01 mm.$^2$. The atmosphere in the bell jar contained sufficient available oxygen (either as oxygen, moisture vapor, or both) to provide the required oxygen in solid solution in the tin film layer. Evaporation of the tin and the tin film buildup was carried out for about one minute to form a tin layer about 2000 A. thick. In very dry atmospheres it was found preferable to introduce some dry oxygen, raising the pressure to about $10^{-4}$ mm. mercury, during the formation of the tin film.

After the tin film had been deposited to the desired thickness, the resulting assembly of Al-Al$_2$O$_3$-Sn on the slide was removed from the bell jar, and leads were soldered to the aluminum and tin strips as shown in FIG. 4. This device was found to have essentially linear voltage-current characteristics for small applied voltages and a resistance of about 100 ohms attributable to the thin priming layer of aluminum oxide. Higher voltages yielded a typical tunnel emission characteristic. An electrical potential was then applied, first at about 0.1 volt. As the resistance increased with the growth of the aluminum oxide barrier film, the voltage was increased. For this particular assembly it was found that the maximum voltage which could be applied was about 3 volts. At higher voltages the device was destroyed. The final oxide film thickness was about 30 A. As an alternative to increasing the applied voltage by periodic discrete increments, the required increase in voltage can be continuously effected by placing an appropriately chosen resistor in series with the device in the circuit. As the resistive barrier film increases in thickness, its resistance increases and, hence, greater voltage is developed across it.

In a like manner, assemblies of Al-A$_2$O$_3$-Pb were formed. In these devices, electrical potentials up to 6 volts could be applied across the assembly before breakdown occurred. In both cases growth of the barrier was found to take place at potentials as small as 0.1 volt. It will be seen from these examples that a range of voltage-current characteristics can be obtained by proper choice of the electrically conducting materials.

As will be apparent from the above description of the method of this invention, that it is possible to control the thickness of the various layers. Typically, the first film layer on which the film barrier is to be formed will be about 1000 A. The resistive film barrier may then be built up to about 30 A. and the film furnishing the gaseous reaction may be of any suitable thickness such as about 1000–2000 A., for example. These thicknesses may, of course, be varied.

The method of this invention offers a way of making very high performance miniaturized electronic elements including capacitors and resistors. Typical embodiments of these are illustrated in much enlarged form in FIGS. 15–17.

Figure 15:
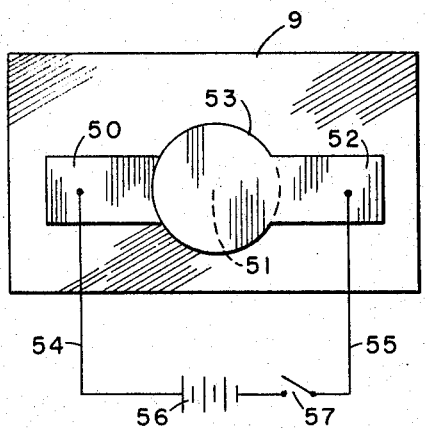
FIG. 15 is a much enlarged top plan view of a capacitor formed in accordance with this invention.

FIG. 15 illustrates a capacitor which may be formed using the process of this invention as described above. Such a capacitor is made by first depositing a thin film of aluminum by vacuum deposition. In FIG. 15 the aluminum film is in the form of a narrow strip 50 which terminates in a circular area 51 on which the capacitor is to be formed. The aluminum film is then exposed to an atmosphere containing oxygen to form a priming film of aluminum oxide. Then a lead film is deposited in such a manner as to contain occluded oxygen. This film, as shown in FIG. 15, comprises a strip 52 which also terminates in a circular area 53 overlapping aluminum circular film 51. Finally, an electrical potential is applied by means of wires 54 and 55 from a source such as batteries 56 and through switch 57. The strength of the potential and the period over which it is applied are adjusted to give the desired aluminum oxide resistive film thickness as illustrated in the examples above.

It has been found that it is possible to obtain capacitances of the order of 1 or more microfarads per square centimeter in capacitors formed in this manner. This compares very favorably with the performance of capacitors made by wet anodizing tantalum, for example, to form a layer of tantalum oxide. Capacitors made in accordance with the method described herein also exhibit high breakdown strengths. Moreover, since barrier film growth may be very accurately controlled and thicknesses as small as about 30 A. formed, the performance of the capacitors thus constructed may be further enhanced, both with respect to reliability and capacity. Considering the fact that capacitance is inversely proportional to thickness, it will be seen that the capacitors made by the process of this invention as shown in FIG. 15 can exhibit consistently good performance characteristics difficult to attain in capacitors constructed by prior art methods. Moreover, the capacitors made by the method of this invention do not exhibit premature breakdown or high leakage currents, both of which are associated with microminiaturized capacitors made by the process of wet anodization. This is probably due at least in part to the fact that the barrier layer of oxide formed by the method of this invention does not contain any occluded impurities such as water and the like which might be derived from a liquid electrolyte as in the case of a wet anodization.

Figure 16:
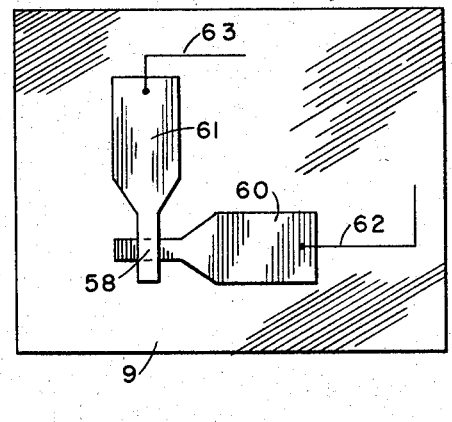
FIG. 16 is a top plan view of a much enlarged resistor formed in accordance with the practice of this invention.

FIG. 16 illustrates a much enlarged top plan view of a typical resistor which may be constructed in accordance with this method and in the same manner as the capacitor of FIG. 15. In this case, it is desired that the resistor element 58 itself comprise as small an area as possible to minimize shunt capacitance. For this reason the films 60 and 61 are laid down in a pattern which minimizes the cross-over area. As in the case of the capacitor, the resistor made in accordance with this process exhibits better performance quality than has heretofore been possible in forming microminiaturized resistors. In particular, the temperature coefficient of resistance between room temperature and liquid helium temperatures is extremely small, the total resistance change being typical a few percent.

Figure 17:
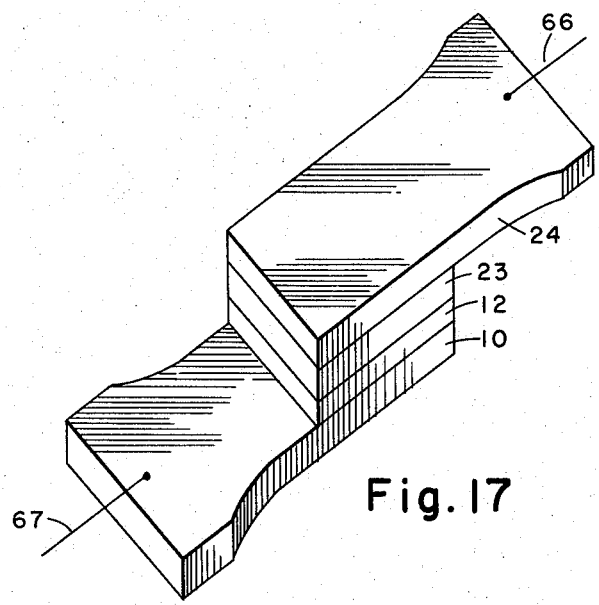
FIG. 17 is a much enlarged perspective view of an electronic element constructed as in FIGS. 8 and 9.

Finally, FIG. 17 is a much enlarged perspective drawing of a variable resistor constructed as in FIG. 9 and consisting of two electrically conducting films 10 and 24, a resistive oxide barrier film 12 and a semiconductor oxide film 23. Wires 66 and 67 are soldered to the two conducting films and they in turn are connected to the remaining portion of a circuit, not shown. As explained in connection with the descriptions of FIGS. 9 and 12, the resistance across this resistor may be varied by varying the direction of electron current flow.

It will, of course, be understood that the configurations shown in FIGS. 15–17 are only typical embodiments and that the actual geometries of such circuit elements may be varied.

In like manner, it is possible to construct such active circuit elements as cryotrons and tunneling devices. In the case of a cryotron this is done by depositing a film of superconducting material, forming on it an insulation layer by the process of this invention, and using the second film which has served as a source of the reactant as a second superconductor. As an example, lead is used as the control, lead oxide as the insulation, and tin as the gate in a cryotron. In like manner, tunneling devices can be made using as the films materials which exhibit different energy gaps under the conditions at which the devices operate. The intervening layer of oxide or other resistive material should, of course, be thin enough to permit the passage of a substantial tunneling current between the two films.

It will be evident from the above description and examples that the method of this invention provides the possibility of forming improved barrier films in greater variety. Moreover, it provides the possibility, of making active and passive circuit elements for microminaturized circuits. These elements have been shown to have performance characteristics which exceed those of elements made by prior art techniques.

It will thus be seen that the objects set forth above, among those made apparent from the preceding description, are efficiently attained; and since certain changes may be made in carrying out the above method and in the construction set forth without departing from the scope of the invention, it is intended that all matter contained in the above description or shown in the accompanying drawings shall be interpreted as illustrative and not in a limiting sense.

We claim:
1. A method of forming an electrically resistive barrier film of a controlled thickness on the surface of an electrically conducting body, comprising the steps of
   (1) providing a body of an electrically conducting film forming material;
   (2) applying a reactant means to a surface of said body for producing a reaction product dielectric film of said body material and said reactant means on said surface of said body to provide a thin priming dielectric film;
   (3) depositing on said priming film a layer of a different electrically conducting material having a lower affinity for ions of said reactant means than said body and containing an occluded quantity of said reactant means, said film and layer defining a growth interface at their meeting surface; and
   (4) applying an electrostatic potential means across said priming film, at a temperature above —35° C., for diffusing ions from said body through said dielectric film and said ions of said reactant means to said film at said growth interface whereby said resistive barrier film is built up in thickness by the reaction product of the two groups of ions.

2. A method in accordance with claim 1 wherein said depositing step (3) comprises depositing said layer of a different electrically conducting material from the vapor phase and occluding said reactant means therein in solid solution.

3. A method in accordance with claim 1 further characterized as including the step of increasing the thickness of said priming dielectric film by a few angstroms prior to said depositing step.

4. A method in accordance with claim 1 wherein said step of providing a body of an electrically conducting material comprises depositing a film of said material on an electrically nonconducting substrate.

5. A method in accordance with claim 1 wherein said body is aluminum and said layer is tin.

6. A method in accordance with claim 1 further characterized by the step of controlling the temperature of the assembly of said body, film and layer while applying said electrostatic potential means thereby to control the rate of increase of said thickness of said resistive barrier film.

7. A method in accordance with claim 1 including the step of applying encapsulating means around the resulting assembly subsequent to forming said resistive barrier.

8. A method in accordance with claim 1 wherein said reactant means is oxygen.

9. A method of forming an electrically resistive barrier film of a controllable thickness on the surface of an electrically conducting body, comprising the steps of
   (1) providing a body of an electrically conducting film forming material;
   (2) applying a reactant means to a surface of said body for producing a reaction product dielectric film of said body material and said reactant means on said surface of said body to provide a thin priming dielectric film;

(3) depositing on said priming film a layer of a different electrically conducting material having a lower affinity for ions of said reactant means than said body, said layer containing passage means for moving said ions of said reactant means, said film and layer defining a growth interface at their meeting surface;

(4) applying an electrostatic potential means across said priming film, at a temperature above $-35°$ C., for diffusing ions from said body through said dielectric film and said ions of said reactant means to said film at said growth interface whereby said resistive barrier film is built up in thickness by the reaction product of the two groups of ions; and (5) simultaneously with the step of applying said electrostatic potential means applying fluid means containing said reactant means to the exposed surface of said layer for providing said reactant means for transport through said layer to said growth interface.

10. A method in accordance with claim 9 wherein said reactant is oxygen.

11. A method in accordance with claim 9 further characterized by the step of increasing the thickness of said priming dielectric film by a few angstroms prior to said depositing step.

12. A method in accordance with claim 9 including the step of applying encapsulating means around the resulting assembly subsequent to forming said resistive barrier.

13. A method in accordance with claim 9 wherein said body is aluminum.

References Cited by the Examiner

UNITED STATES PATENTS

| | | | |
|---|---|---|---|
| 1,877,140 | 9/1932 | Lilienfeld | 317—230 |
| 1,906,691 | 5/1933 | Lilienfeld | 317—233 |
| 2,005,279 | 6/1935 | Van Geel | 317—233 |
| 2,822,606 | 2/1958 | Yoshida | 317—238 |
| 2,887,633 | 5/1959 | Shilliday et al. | 317—238 |
| 3,056,073 | 9/1962 | Mead | 317—238 |
| 3,116,427 | 12/1963 | Giaever | 317—234 |

JOHN W. HUCKERT, *Primary Examiner.*

J. D. KALLAM, *Assistant Examiner.*